(12) United States Patent
Cornille et al.

(10) Patent No.: US 12,427,808 B2
(45) Date of Patent: Sep. 30, 2025

(54) ASSEMBLY FOR A TIRE COMPRISING A THREE-DIMENSIONAL FABRIC OR KNIT AND A SECURING ELEMENT

(71) Applicant: COMPAGNIE GENERALE DES ETABLISSEMENTS MICHELIN, Clermont-Ferrand (FR)

(72) Inventors: Richard Cornille, Clermont-Ferrand (FR); Bastien Limozin, Clermont-Ferrand (FR); Sebastien Rigo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 734 days.

(21) Appl. No.: 16/757,074

(22) PCT Filed: Oct. 18, 2018

(86) PCT No.: PCT/FR2018/052602
§ 371 (c)(1),
(2) Date: Apr. 17, 2020

(87) PCT Pub. No.: WO2019/077280
PCT Pub. Date: Apr. 25, 2019

(65) Prior Publication Data
US 2020/0254819 A1    Aug. 13, 2020

(30) Foreign Application Priority Data
Oct. 18, 2017   (FR) ...................................... 1759772

(51) Int. Cl.
*B60C 3/02* (2006.01)
*B32B 5/06* (2006.01)
(Continued)

(52) U.S. Cl.
CPC ................ *B60C 3/02* (2013.01); *B32B 5/073* (2021.05); *B32B 5/26* (2013.01); *B60C 3/04* (2013.01);
(Continued)

(58) Field of Classification Search
CPC ......... D03D 11/00; B60C 9/1807; B60C 3/02; B60C 3/04; B60C 5/12; B60C 7/18;
(Continued)

(56) References Cited

U.S. PATENT DOCUMENTS 3,424,220 A * 1/1969 Schuerch ............... D04B 1/123
152/526
4,336,296 A * 6/1982 Fukuta ................. D03D 41/004
442/205

(Continued)

FOREIGN PATENT DOCUMENTS

EP          1699266      *  9/2006
WO     2016/116490 A1      7/2016
(Continued)

OTHER PUBLICATIONS

Machine translation of EP 1699266, 2006.*
(Continued)

*Primary Examiner* — Jennifer A Gillett
(74) *Attorney, Agent, or Firm* — VENABLE LLP

(57) ABSTRACT

An assembly (1) comprises: a first structure (10) formed by first filamentary elements (15), a second structure (12) formed by second filamentary elements (16), a supporting structure (14) comprising supporting filamentary elements linking the first filamentary elements (15) and the second filamentary elements (16), and at least one filamentary securing element (18) interlaced with the first filamentary elements (15) and the second filamentary elements (16), one of the ends (18*a*, 18*b*) of the securing element (18) being (Continued)

free to slip relative to the first and second filamentary elements (15, 16).

16 Claims, 4 Drawing Sheets

(51) Int. Cl.
| | |
|---|---|
| *B32B 5/26* | (2006.01) |
| *B60C 3/04* | (2006.01) |
| *B60C 5/00* | (2006.01) |
| *B60C 5/12* | (2006.01) |
| *B60C 7/18* | (2006.01) |
| *B60C 9/02* | (2006.01) |
| *B60C 9/11* | (2006.01) |
| *B60C 9/18* | (2006.01) |
| *B60C 17/00* | (2006.01) |

(52) U.S. Cl.
CPC ............ *B60C 5/12* (2013.01); *B60C 7/18* (2013.01); *B60C 9/02* (2013.01); *B60C 9/11* (2013.01); *B60C 9/1807* (2013.01); *B60C 5/00* (2013.01); *B60C 2017/0081* (2013.01)

(58) Field of Classification Search
CPC .... B60C 9/02; B60C 9/11; B60C 5/00; B60C 2017/0081; B60C 7/146; B60C 17/00; B60C 17/009; B32B 5/073; B32B 5/26
See application file for complete search history.

(56) References Cited

U.S. PATENT DOCUMENTS

| | | | |
|---|---|---|---|
| 2002/0081926 A1* | 6/2002 | Goering | B29C 70/222 |
| | | | 442/181 |
| 2004/0237599 A1* | 12/2004 | Kondou | D04B 15/48 |
| | | | 66/202 |
| 2014/0205795 A1* | 7/2014 | Hu | B32B 5/028 |
| | | | 28/165 |
| 2016/0121663 A1* | 5/2016 | Sportelli | B60C 9/11 |
| | | | 152/542 |
| 2017/0014895 A1* | 1/2017 | Kang | B21F 27/128 |
| 2017/0297374 A1* | 10/2017 | Sportelli | B32B 5/026 |
| 2018/0009263 A1 | 1/2018 | Vilcot | |
| 2018/0194169 A1 | 7/2018 | Vilcot et al. | |
| 2018/0361790 A1 | 12/2018 | Rigo et al. | |
| 2018/0361791 A1 | 12/2018 | Rigo et al. | |

FOREIGN PATENT DOCUMENTS

| | | |
|---|---|---|
| WO | 2017/005713 A1 | 1/2017 |
| WO | 2017/103490 A1 | 6/2017 |
| WO | 2017/103491 A1 | 6/2017 |

OTHER PUBLICATIONS

Link Deinfition in the Cambridge English Dictionary, https://dictionary.cambridge.org/us/dictionary/english/link, retreived Nov. 22, 2023.*
International Search Report dated Feb. 8, 2019, in corresponding PCT/FR2018/052602 (4 pages).

* cited by examiner

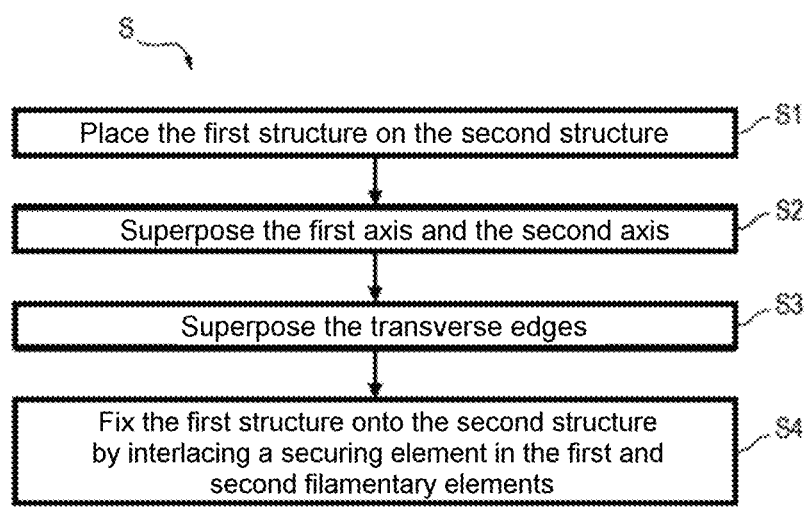

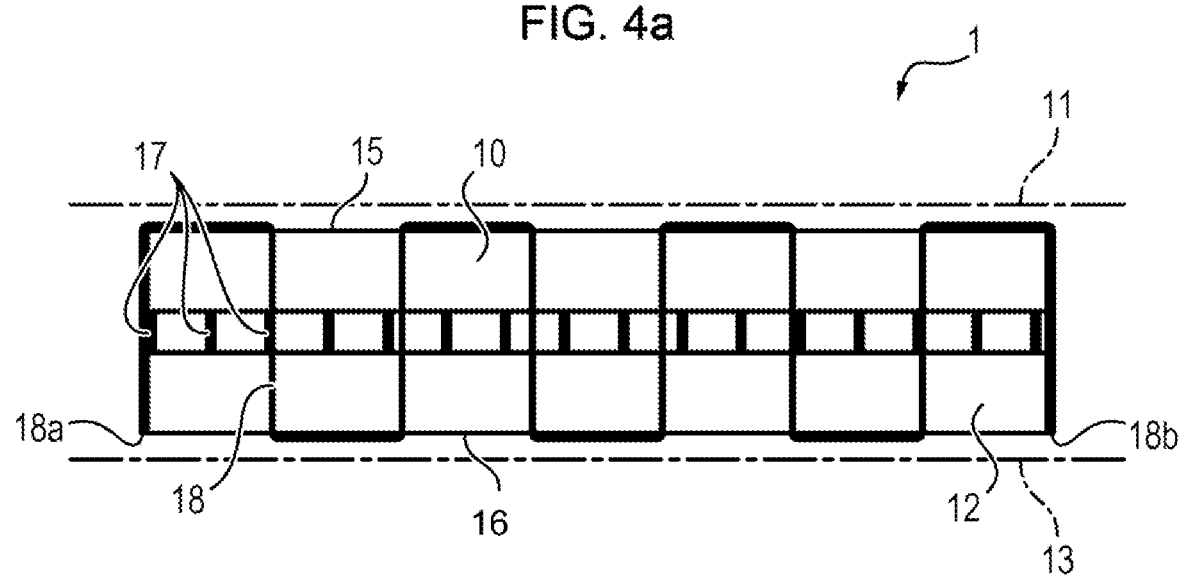
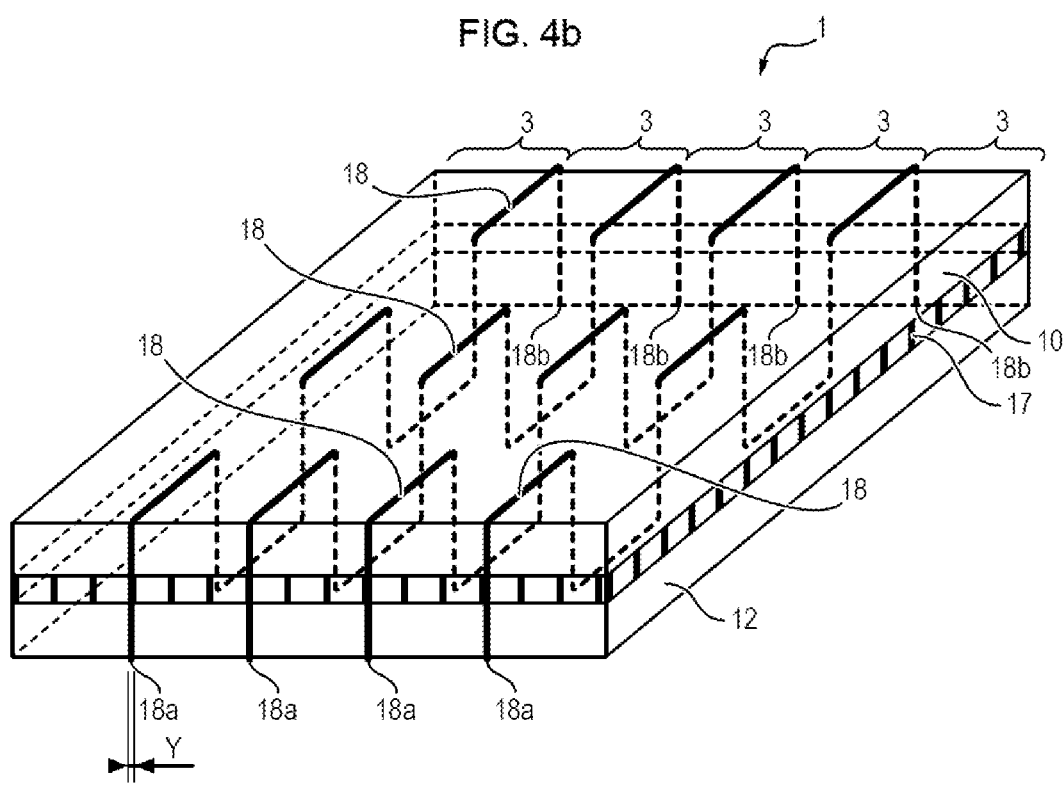

ASSEMBLY FOR A TIRE COMPRISING A THREE-DIMENSIONAL FABRIC OR KNIT AND A SECURING ELEMENT

FIELD OF THE INVENTION

The invention relates generally to the field of tyres for a vehicle, typically a private passenger vehicle, a two-wheel vehicle, a heavy goods truck, an agricultural or civil engineering vehicle or an aeroplane, or, more generally, for any rolling device. More specifically, the invention relates to the flattening of such a tyre.

TECHNOLOGICAL BACKGROUND

A tyre 4 is a toroidal structure intended to be mounted on a rim, pressurized by an inflation gas and flattened on a ground under the action of a load.

As can be seen in FIG. 1 which illustrates an example of a tyre 4, a tyre 4 has a running surface (that is to say a surface intended to enter into contact with a ground), a running plane (that is to say a plane normal to the axis of revolution Y-Y' and which intersects the running surface), a circumferential axis X-X' (which corresponds to an axis of the running plane which is tangential to the running surface) and a radial axis Z-Z' (which corresponds to an axis transversal to the axis of revolution Y-Y' of the tyre 4 and which intersects the axis of revolution Y-Y').

As is known per se, the tyre 4 comprises, from the axis of revolution Y-Y' to its running surface, a carcass, a crown arranged radially on the outside of the carcass 3 and a tread 7.

The carcass is a structure of revolution comprising a carcass ply comprising carcass reinforcing elements. The carcass reinforcing elements are substantially parallel to one another in a given direction and form an angle greater than or equal to 65°, preferably greater than or equal to 80° and here more preferentially substantially equal to 90° with the circumferential axis of the tyre 4. The carcass reinforcing elements can notably comprise textile filamentary reinforcing elements, for example comprising two 144 tex polyester yarns wound with 290 turns together.

The crown 6 is a structure of revolution arranged radially on the outside of the carcass and comprises two working plies and one hooping ply.

Each working ply comprises working reinforcing elements. The working reinforcing elements are substantially parallel to one another in a direction and form an angle ranging from 15° and 40°, preferably ranging from 20° to 30° with the circumferential axis of the tyre 4 and here equal to 26°. The working reinforcing elements are crossed from one working ply to another. They can notably comprise metal filamentary reinforcing elements, for example cables of 2×0.30 mm structure.

The hooping ply is arranged radially on the outside of the working plies and comprises hooping filamentary reinforcing elements substantially parallel to one another forming an angle at most equal to 10°, preferably ranging from 5° to 10°, with the circumferential direction of the tyre 4, and here equal to 5°. The hooping reinforcing elements can comprise textile filamentary reinforcing elements, for example comprising two 167 tex aramid yarns wound with 315 turns together.

The tread 7 is arranged radially on the outside of the crown and is intended to enter into contact with a ground. The running surface therefore corresponds to all or part of the radially outer face of the tread.

The carcass ply, the working plies and the hooping ply are produced in one or more polymeric compositions, for example elastomeric compositions, comprising at least one elastomer, preferably dienic, for example natural rubber, in which the corresponding reinforcing elements are embedded.

The tread 7 is produced in a polymeric composition, for example an elastomeric composition comprising at least one elastomer, preferably dienic, for example natural rubber.

In order to improve the flattening of the tyre 4, it has been proposed to replace all or part of the carcass with an assembly comprising a first structure formed by first filamentary elements, a second structure formed by second filamentary elements and a supporting structure comprising supporting filamentary elements linking the first structure and the second structure. The first structure and the second structure can be coated or impregnated with an elastomeric composition, typically rubber, for example by calendering.

This assembly can for example be formed by a three-dimensional fabric or a three-dimensional knit. Reference can notably be made to the documents WO2017/103490 and WO 2017/103491, in the name of the Applicant, which describe examples of assemblies and their manufacturing methods.

Such an assembly makes it possible to significantly improve the flattening of the tread when the tyre 4 is subjected to a load.

However, the Applicant found that the flattening of the tread was further improved when the top structure and the bottom structure of the assembly were perfectly aligned in the tyre 4. Now, it is commonplace, in the handling of the assembly, for one of the structures to slip relative to the other, so the supporting structure was not then taut so their relative movement could not therefore be prevented.

For that, the document WO2017/103490 teaches the use of a sacrificial means for fixing the top structure onto the bottom structure in the handling of the assembly. In particular, the sacrificial means makes it possible to guarantee the correct positioning of the two structures until they are placed on the building drum. This sacrificial means is moreover dimensioned so as to break before the supporting elements are tautened and broken when the top structure and the bottom structure are separated from one another, for example at the time of the inflation of the tyre. However, the Applicant found that it could be difficult to correctly dimension the sacrificial means in order to guarantee both the holding in position of the top and bottom structures in handling and the breaking thereof at the time of inflation. Now, when the sacrificial means does not break upon inflation, that causes the manufacturing of the assembly to be slowed down. On the other hand, when the sacrificial means breaks during the handling of the assembly, the first structure and the second structure become misaligned, thus compromising the flattening of the tread. The use of sacrificial means does not therefore make it possible to guarantee the alignment of the structures, unless they are dimensioned accurately on each new assembly. Furthermore, the sacrificial means must be capable of withstanding the gluing temperatures, which can exceed 200° C.

SUMMARY OF THE INVENTION

One aim of the invention is to propose a novel assembly, an associated manufacturing method and an associated tyre which make it possible to overcome the difficulties of alignment of the first structure and the second structure of the assembly in a simple, efficient and inexpensive way without in any way slowing down the manufacturing of the assembly and of the tyre, and which make it possible to guarantee that a tyre is obtained in which the flattening of the tread is significantly improved.

For that, the invention proposes an assembly comprising:
- a first structure formed by first filamentary elements, the first structure having a longitudinal edge extending in a first direction which defines a first axis,
- a second structure formed by second filamentary elements, the second structure comprising a longitudinal edge extending in a second direction which defines a second axis,
- a supporting structure comprising supporting filamentary elements linking the first filamentary elements of the first structure and the second filamentary elements of the second structure.

The assembly further comprises at least one filamentary securing element interlaced with the first filamentary elements and the second filamentary elements, said securing element having a first end and a second end, at least one out of the first end and the second end of the securing element being free to slip relative to the first and second filamentary elements. Furthermore, the first axis and the second axis are parallel.

Some preferred but nonlimiting features of the assembly described above are as follows, taken individually or in combination:
- the securing element is arranged so that, when the first structure and the second structure are separated from one another, at least one out of the first end and the second end of the securing element slips relative to the first and second filamentary elements.
- the securing element is arranged so that, when the first structure and the second structure are separated from one another so as to tauten without breaking the supporting filamentary elements, at least one out of the first end and the second end of the securing element slips relative to the first and second filamentary elements without causing the securing element to break.
- the first axis and the second axis are superposed.
- the first structure and the second structure each comprise a transverse edge extending at right angles to their longitudinal edge, and in which the transverse edge of the first structure and the transverse edge of the second structure are superposed.
- the first end and the second end of the securing element are free to slip relative to the first and second filamentary elements.
- the first structure has two opposing transverse edges extending transversely to its longitudinal edge, a length of the first structure being equal to a shorter distance between its transverse edges when the first structure is flat, and in which the assembly comprises at least one securing element extending over all or part of the length of the first structure.
- the securing element extends over at least 50% of the length of the first structure.
- the securing element extends in a third direction which defines a third axis, an angle between the third axis and the first axis being non-zero.
- the securing element comprises at least one of the following elements: a textile filament, a metal filament, a filament made of composite material. And/or
- the assembly comprises at least two distinct securing elements.

According to a second aspect, the invention also proposes a method for manufacturing an assembly as described above, said manufacturing method comprising the following steps:
- placing the first structure on the second structure so that the first axis and the second axis are substantially parallel, and
- fixing the first structure onto the second structure by interlacing a securing element with the first filamentary elements and the second filamentary elements so as to hold the first structure in position relative to the second structure, one out of the first end and the second end of the securing element being left free to slip relative to the first and second filamentary elements.

Some preferred but nonlimiting features of the manufacturing method described above are as follows, taken individually or in combination:
- the method comprises, after the fixing step, a step of separation of the first structure and the second structure from one another during which at least one out of the first end and the second end of the securing element slips relative to the first and second filamentary elements.
- during the separation step, at least one out of the first end and the second end of the securing element slips relative to the second filamentary elements without causing the securing element to break.
- the method further comprises, prior to the fixing step, a step during which the first axis and the second axis are superposed.
- the first structure and the second structure each comprise a transverse edge extending transversely to their respective longitudinal edge, the method further comprising, prior to the fixing, a step during which the transverse edge of the first structure and the transverse edge of the second structure are superposed.
- the first structure has two opposing transverse edges extending transversely to its longitudinal edge, a length of the first structure being equal to a shorter distance between its transverse edges when the first structure is flat, the first structure being fixed over all or part of its length onto the second structure.
- the securing element fixes the first structure onto the second structure over at least 50% of its length.
- two securing elements are interlaced with the first filamentary elements and the second filamentary elements in two distinct zones of the assembly.

According to a third aspect, the invention proposes a tyre having an axis of revolution and comprising:
- an assembly obtained in accordance with a production method described above, and
- an annular space delimited radially by an inner face of the first structure and by an inner face of the second structure.

BRIEF DESCRIPTION OF THE DRAWINGS

Other features, aims and advantages will become more apparent on reading the following detailed description, and on looking at the attached drawings given as nonlimiting examples and in which:

FIG. 3 is a flow diagram illustrating steps of a method for manufacturing an assembly according to an embodiment of the invention.

FIGS. 4a and 4b respectively illustrate a cross-sectional view along a securing element and a perspective view of an example of production of an assembly according to the invention.

DETAILED DESCRIPTION OF AN EMBODIMENT

Assembly 1

Figure 1:
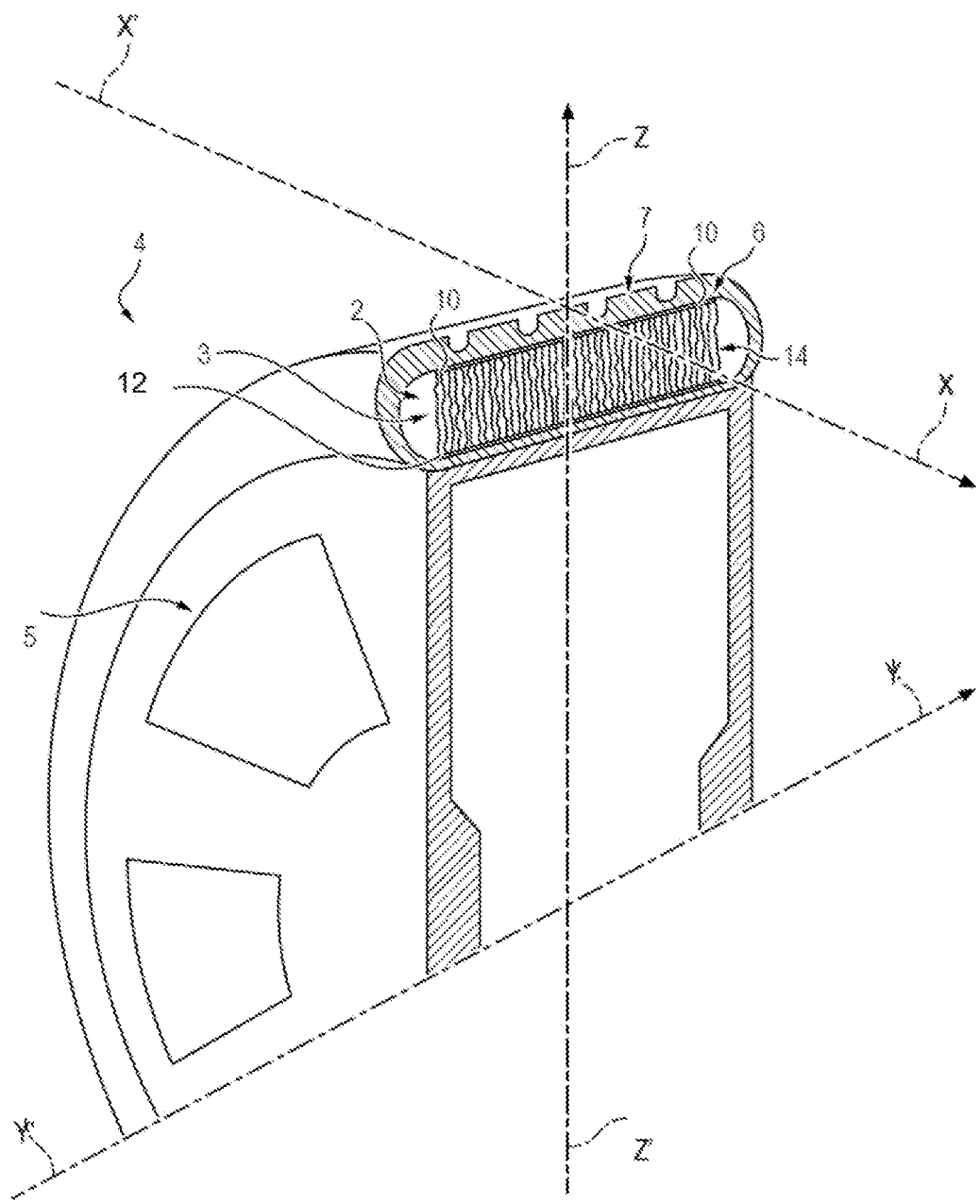
FIG. 1 is a perspective and partial cross-sectional view of an example of production of a tyre according to an embodiment of the invention represented in the absence of applied load and pressure.

The assembly 1 comprises:
- a first structure 10 formed by first filamentary elements 15,
- a second structure 12 formed by second filamentary elements 16, and
- a supporting structure 14 comprising supporting filamentary elements 17 linking the first structure 10 and the second structure 12.

Examples of assemblies 1 comprising these three structures 10, 12, 14 and that can be used have for example been described in detail in the documents WO2017/103490 and WO 2017/103491 described above.

More specifically, the first structure 10 is overall trapezoidal (for example parallelepipedal or rectangular) and has a first longitudinal edge 10a extending in a first direction which defines a first axis 11, a second longitudinal edge 10b opposite the first longitudinal edge 10a and two opposing transverse edges 10c, 10d, extending transversely to the first and second longitudinal edges 10a, 10b.

Similarly, the second structure 12 is overall trapezoidal (for example parallelepipedal or rectangular) and has a first longitudinal edge 12a extending in a second direction which defines a second axis 13, a second longitudinal edge 12b opposite the first longitudinal edge 12a and two opposing transverse edges 12c, 12d, extending transversely to the first and second longitudinal edges 12a, 12b.

In one embodiment, the first structure and the second structure 10, 12 can comprise a fabric formed by an interlacing of warp filaments (the first and second filamentary elements 15, 16) and of weft filaments. The assembly 1 is thus a three-dimensional fabric.

As a variant, the first structure and the second structure 10, 12 can comprise a knit, in which case the assembly 1 is a three-dimensional knit.

Whatever the production variant, the weave of the fabric of the first and/or of the second structure 12 can be of canvas, serge, knit or satin. In the case of an assembly 1 for a tyre 4, a weave of canvas type makes it possible to achieve good mechanical performance levels.

According to yet another variant, one out of the first structure and the second structure 10, 12 comprises a fabric, the other out of the first structure and the second structure 10, 12 being able to comprise a knit.

Typically, the assembly 1 can comprise a three-dimensional fabric or knitted fabric of single- or double-wall canvas weave type, such as, for example: the double-wall fabric PF-Farbroller-GR3-7103_01 marketed by the company PILE FABRICS GmbH; the knit N-02570-A01 marketed by the company HEATHCOAT FABRICS Limited.

The assembly 1 further comprises at least one filamentary securing element 18 interlaced with the first filamentary elements 15 and the second filamentary elements 16 in order to hold the first structure 10 in position relative to the second structure 12 so that the first axis 11 and the second axis 13 are parallel. Moreover, the securing element 18 has a first end 18a and a second end 18b, and at least one out of the first end 18a and the second end 18b of the securing element 18 is free to slip relative to the first and second filamentary elements 15, 16.

It will be noted in particular that the securing element 18 thus makes it possible to guarantee the correct positioning of the first structure 10 relative to the second structure 12 by virtue of the friction forces between the securing element 18 and the first and second filamentary elements 15, 16, in their zones of contact.

In particular, and for the purposes of the manufacturing method described below, the securing element 18 is arranged so that when the first structure 10 and the second structure 12 are separated from one another at least one out of the first end 18a and the second end 18b of the securing element 18 slips relative to the first and second filamentary elements 15, 16. It will be noted also that, contrary to the assembly described in WO2017/103490, the securing element 18 is, here, arranged so that, when the first structure 10 and the second structure 12 are separated from one another so as to tauten without breaking the supporting filamentary elements 17, at least one out of the first end 18a and the second end 18b of the securing element 18 slips relative to the first and second filamentary elements 15, 16 without causing the at least one securing element 18 to break.

Preferably, the first axis 11 and the second axis 13 are further superposed and/or the first and second transverse edges 10a, 12a, 10b, 12b of the first structure and of the second structure 12, respectively, are superposed. Superposed will be understood here to mean that the first axis 11 and the second axis 13 (respectively the first and second transverse edges 10a, 12a, 10b, 12b) belong to a determined plane which corresponds to the plane passing through the first axis 11 (respectively the first transverse edge 10a or the second transverse edge 10b) and which is at right angles to the surface of the first structure 10 when the first structure 10 is placed flat on a flat surface.

The alignment tolerance of the first axis 11 and of the second axis 13 and the superpositioning tolerance of the edges (longitudinal 10a, 12a, 10b, 12b and/or transverse 10c, 12c, 10d, 12d) is less than or equal to two millimetres, preferably less than or equal to one millimetre.

In one embodiment, both the first axis 11 and the second axis 13 on the one hand and the transverse edges 10c, 10d, 12c, 12d of the first structure 10 and the second structure 12 on the other hand are superposed, so that the first structure and the second structure 10, 12 are perfectly superposed and aligned (with a tolerance less than or equal to two millimetres, preferably less than or equal to one millimetre). By virtue of the interlacing of the securing element 18 with the first filamentary elements 15 and the second filamentary elements 16, the alignment is assured throughout the entirety of the handling of the assembly 1 until at least it is on a tyre 4 building drum 5.

An example of interlacing is for example illustrated in FIGS. 4a and 4b. In this example, the interlacing is done according to a regular pitch: an irregular or periodic pitch can however also be envisaged.

The securing element 18 can comprise at least one of the following elements: a textile filament, a metal filament or even a filament made of composite material. The constituent material of the securing element 18 is chosen so as to withstand the gluing temperatures. Preferably, the securing element 18 therefore has a melting point greater than 200° C., and preferably greater than 230° C.

For example, the textile filament can be produced in at least one of the following materials: polyester, polyamide, polyketone, polyvinyl alcohol, cellulose, a mineral fibre, a natural fibre, an elastomeric material or a mixture of these materials. Polymers that can be cited include, for example, PET (polyethylene terephthalate), PEN (polyethylene naphthalate), PBT (polybutylene terephthalate), PBN (polybutylene naphthalate), PPT (polypropylene terephthalate), PPN (polypropylene naphthalate). Polyamides that can be cited include the aliphatic polyamides such as the polyamides 4-6, 6, 6-6 (nylon) and the aromatic polyamides such as aramid.

In an exemplary production, the filament can be an assembly of fibres comprising one or more mono-filamentary or multi-filamentary fibres, textiles, metal and/or composite fibres, twisted together or not. Thus, in one embodiment, the assembly of fibres comprises fibres that are substantially parallel to one another or wound helically.

The diameter of the filament can be between 2 mm and 0.1 mm.

The securing element 18 can extend continuously or discontinuously between the transverse edges 10c, 10d, 12c, 12d and/or between the longitudinal edges 10a, 10b, 12a, 12b of the first and second structures 10, 12. As a variant, the securing element 18 could also extend along an axis forming an angle that is neither zero nor equal to 90° with the first axis 11.

Continuous will be understood here to mean that the securing element 18 extends over all the length L (respectively all the width l) of the first structure 10 (the length L corresponding to the smallest distance between the transverse edges 10c, 10d of the first structure 10 when the first structure 10 is flat or, more simply, to the length L of its longitudinal edges 10a, 10b when the first structure 10 is parallelepipedal or rectangular while the width l corresponding to the smallest distance between the longitudinal edges 10a, 10b of the first structure 10 when the first structure 10 is flat or, more simply, to the width l of its transverse edges 10c, 10d when the first structure 10 is parallelepipedal or rectangular).

Figure 2:
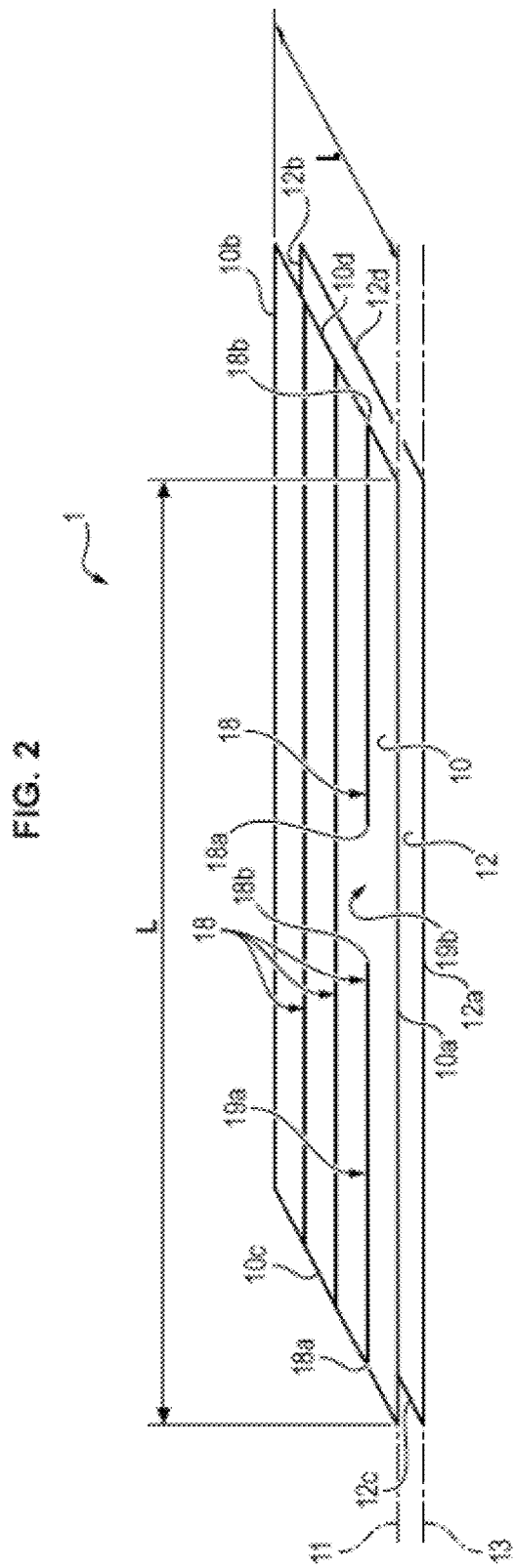
FIG. 2 is a perspective view of an example of production of an assembly according to an embodiment of the invention, in which the supporting structure of the assembly has been omitted.

Discontinuous will be understood here to mean that the securing element 18 extends over only a part of the length L (respectively, of the width l) of the first structure 10, preferably over at least 50% of its length L (respectively, of the width l). In this case, as illustrated in FIG. 2, the securing element 18 preferably comprises at least two adjacent segments 19a separated by a determined distance 19b. In order to guarantee that the first structure 10 and the second structure remain perfectly aligned and superposed at all points of the assembly 1, even when the assembly 1 is being handled, the distance 19b can notably be at most equal to a metre. In one embodiment, the distance 19b is less than a meter, preferably less than 75 cm. In order to cover at least 50% of the length L of the first structure 10, it will be understood that the number of segments 19a of the securing element 18 increases as their dimension decreases.

The width y (dimension in the plane of the first structure 10 and extending in a direction at right angles to the longitudinal edges 10a, 10b of the first structure 10) of the securing element 18 can be continuously over the length L (respectively, the width l) of the first structure 10, or variable. A continuous width y is however easier to produce industrially.

The securing element 18 can extend along and adjacent to one of the longitudinal edges 10a, 10b (respectively, of the transverse edges 10c, 10d) of the first structure 10, or as a variant, at a distance from said longitudinal edge 10a, 10b (respectively of the transverse edge 10c, 10d).

Optionally, the outer face (that is to say the face opposite the space 2 formed between the first structure and the second structure 10, 12) of the first structure 10 and the second structure 12 can be impregnated with an elastomeric composition.

Method for Manufacturing S an Assembly 1

An example of manufacturing S of such an assembly 1 will now be described.

During a first step S1, a set comprising a first structure 10, a second structure 12 and a supporting structure 14 is supplied. This set is generally produced beforehand as is known per se and/or can be supplied in roll form, for example from the companies PILE FABRICS GmbH or GIRMES INTERNATIONAL GmbH.

In the case where the set is supplied in the form of a roll, the set is unwound and placed flat so that one out of the first structure and the second structure 10, 12 is located on a support surface. In this position, the first structure and the second structure 10, 12 are therefore stacked on the support surface, the filamentary elements of the supporting structure 14 being already interlaced with the first and second filamentary elements 15, 16.

During a second step S2, the position of the first structure and of the second structure 10, 12 is adjusted so that the first axis 11 and the second axis 13 are parallel, and, if necessary, superposed. Optionally, during a third step S3, their position is also adjusted so that their first transverse edges 10c, 12c and/or their second transverse edges 10d, 12d are superposed.

Preferably, the position of the first structure and of the second structure 10, 12 is adjusted so that the first axis 11 and the second axis 13 are parallel and superposed and that their first transverse edge and their second transverse edge 10c, 10d, 12c, 12d are superposed. It will of course be understood that the steps S1, S2 and S3 can be performed simultaneously or in succession, in which case these steps S1, S2 and S3 can be implemented in a different order without in any way departing from the scope of the invention.

In these steps S1, S2 and/or S3, the first structure and the second structure 10, 12 can be flat over all their length L, or, as a variant, the set can be unwound only partly, the rest of the set being unwound as required during the third step of the method S.

During a fourth step S4, the first structure and the second structure 10, 12 are fixed together by a securing element 18 by interlacing the securing element 18 with the first and second filamentary elements 15, 16, in order to prevent the movement of the first structure 10 relative to the second structure 12 during the handling and the use of the assembly 1. At least one out of the first end and the second end 18a, 18b of the securing element 18 is left free to slip relative to the first and second filamentary elements 15, 16, so as to hold the position of the first structure 10 relative to the second structure 12 by friction during the storage and the handling of the assembly 1.

In one embodiment, both the first end and the second end 18a, 18b of the securing element are left free to slip relative to the first and second filamentary elements 15, 16.

When one of the ends 18a, 18b of the securing element 18 is fixed onto the first structure 10 or the second structure, its fixing can be done by stitching, by gluing or by ultrasound welding.

The first structure and the second structure 10, 12 can be fixed by interlacing a single securing element or, as illustrated in the figures, by several distinct securing elements 18. In this case, the distinct securing elements 18 can extend parallel to one another or transversely to one another.

As variant, the steps S1 to S4 can be performed directly by the weaver in the loom used for the production of the set, in order to guarantee that the first structure and the second structure 10, 12 are perfectly aligned and to avoid winding and unwinding operations that are likely to generate alignment difficulties.

Optionally, the outer face of the first structure 10 and the second structure 12 can be impregnated with an elastomeric composition, typically rubber, for example by calendering. This impregnation can be done after the interlacing S4 of the first structure and second structure 12 with the securing element 18.

If appropriate, the assembly 1 can then be handled and notably wound around a cylinder for the storage thereof prior to its use. This handling is notably facilitated by the secure fixing of the first structure 10 with the second structure 12, which prevents any slippage of one of the structures 10, 12 relative to the other 12, 10.

Production of a Tyre 4

The assembly 1 thus obtained can notably be used in the production of a tyre 4.

For that, the assembly 1 is placed on a building drum 5 in order to produce a tyre 4. If necessary, the assembly 1 can be previously cut. The assembly 1 will act as carcass in the tyre 4.

An annular space 2 delimited radially by an inner face of the first structure 10 and an inner face of the second structure 12 is then formed (see FIG. 1). In the course of the formation of this space during which the first structure 10 and the second structure 12 are separated from one another, the securing element 18 and at least one out of the first end 18a and the second end 18b of the securing element 18 slip relative to the first structure and the second structure 10, 12, at least one of its ends 18a, 18b not being fixed onto the first structure 10 or the second structure 20, thus allowing the radial separation of the first structure 10 relative to the second structure 12. The annular space 2 can for example be formed by inflation. During the separation step, at least one out of the first end 18a and the second end 18b of the securing element 18 slips relative to the first and second filamentary elements 15, 16 without causing the securing element 18 to break.

It will be noted in particular that the securing element 18 makes it possible to guarantee the correct positioning of the first structure 10 relative to the second structure 12 until they are placed on the building drum 5. Indeed, the securing element 18 is capable of keeping the first structure 10 aligned with the second structure 12, by virtue of the friction forces between the securing element 18 and the first and second filamentary elements 15, 16, in their zones of contact. The tyre 4 is then formed by adding and successively fixing a crown 6 and a tread 7. The crown 6 and the tread 7 can be conventional.

Reference will notably be able to be made to the documents WO2017/103490 and WO 2017/103491 described above for more details on the means for manufacturing a tyre 4 with such an assembly 1.

The invention claimed is:
1. An assembly comprising:
    a first structure formed by first filamentary elements, the first structure having a longitudinal edge extending in a first direction which defines a first axis;
    a second structure formed by second filamentary elements, the second structure having a longitudinal edge extending in a second direction which defines a second axis; and
    a supporting structure comprising supporting filamentary elements linking the first filamentary elements of the first structure and the second filamentary elements of the second structure, wherein the supporting filamentary elements of the supporting structure are interlaced with the first filamentary elements and the second filamentary elements,
    wherein the assembly further comprises at least one filamentary securing element interlaced with the first filamentary elements and the second filamentary elements, the at least one securing element having a first end and a second end, and at least one of the first and the second ends of the at least one securing element being free to slip relative to the first filamentary elements and the second filamentary elements,
    wherein the first axis and the second axis are parallel, and
    wherein the at least one securing element is arranged so that, when the first structure and the second structure are separated from one another so as to tauten without breaking the supporting filamentary elements, at least one of the first end and the second end of the at least one securing element slips relative to the first filamentary elements and the second filamentary elements without causing the at least one securing element to break.

2. The assembly according to claim 1, wherein the at least one securing element is arranged so that, when the first structure and the second structure are separated from one another, at least one of the first end and the second end of the at least one securing element slips relative to the first filamentary elements and the second filamentary elements.

3. The assembly according to claim 1, wherein the first axis and the second axis are superposed.

4. The assembly according to claim 1, wherein the first structure and the second structure each comprise a transverse edge extending at right angles to the respective longitudinal edge, and
    wherein the transverse edge of the first structure and the transverse edge of the second structure are superposed.

5. The assembly according to claim 1, wherein the first end and the second end of the at least one securing element are free to slip relative to the first filamentary elements and the second filamentary elements.

6. The assembly according to claim 1, wherein the first structure has two opposing transverse edges extending transversely to the longitudinal edge, a length of the first structure being equal to a shortest distance between the two opposing transverse edges when the first structure is placed on a flat surface, and
    wherein the at least one securing element extends over all or part of the length of the first structure.

7. The assembly according to claim 1, wherein the at least one securing element extends in a third direction which defines a third axis, an angle between the third axis and the first axis being non-zero.

8. A method for manufacturing an assembly according to claim 1, the method comprising the following steps:
    placing the first structure on the second structure so that the first axis and the second axis are substantially parallel, and
    fixing the first structure on the second structure by interlacing the at least one securing element with the first filamentary elements and the second filamentary elements so as to hold the first structure in position relative to the second structure, one of the first end and the second end of the at least one securing element being left free to slip relative to the first filamentary elements and the second filamentary elements.

9. The method according to claim 8, further comprising, after fixing the first structure on the second structure, separating the first structure and the second structure from one another, during which at least one of the first end and the second end of the at least one securing element slips relative to the first filamentary elements and the second filamentary elements.

10. The method according to claim 9, wherein, while separating the first structure and the second structure from one another, at least one of the first end and the second end of the at least one securing element slips relative to the first filamentary elements and the second filamentary elements without causing the at least one securing element to break.

11. The method according to claim 8, further comprising, prior to fixing the first structure on the second structure, superposing the first axis and the second axis.

12. The method according to claim 8, wherein the first structure and the second structure each comprise a transverse edge extending transversely to the respective longitudinal edge, the method further comprising, prior to fixing the first structure on the second structure, superposing the transverse edge of the first structure and the transverse edge of the second structure.

13. The method according to claim 8, wherein the first structure has two opposing transverse edges extending transversely to the longitudinal edge, a length of the first structure being equal to a shorter distance between the transverse edges when the first structure is flat, and the first structure being fixed over all or part of its length onto the second structure.

14. A tire having an axis of revolution and comprising:
an assembly manufactured according to claim 8; and
an annular space delimited radially by an inner face of the first structure and by an inner face of the second structure.

15. An assembly comprising:
a first structure formed by first filamentary elements, the first structure having a longitudinal edge extending in a first direction which defines a first axis;
a second structure formed by second filamentary elements, the second structure having a longitudinal edge extending in a second direction which defines a second axis; and
a supporting structure comprising supporting filamentary elements linking the first filamentary elements of the first structure and the second filamentary elements of the second structure,
wherein the assembly further comprises at least one filamentary securing element interlaced with the first filamentary elements and the second filamentary elements, the at least one securing element having a first end and a second end, and at least one of the first and the second ends of the at least one securing element being free to slip relative to the first filamentary elements and the second filamentary elements,
wherein the first axis and the second axis are parallel,
wherein the first structure and the second structure are separated by a space, the space consisting of at most the supporting structure and the at least one filamentary securing element, and
wherein the at least one securing element is arranged so that, when the first structure and the second structure are separated from one another so as to tauten without breaking the supporting filamentary elements, at least one of the first end and the second end of the at least one securing element slips relative to the first filamentary elements and the second filamentary elements without causing the at least one securing element to break.

16. The assembly according to claim 15, wherein the space has a variable volume depending on a quantity of air injected between the first structure and the second structure.

* * * * *